US00RE36034E

United States Patent [19]

Sheridan

[11] E Patent Number: Re. 36,034

[45] Reissued Date of Patent: Jan. 12, 1999

[54] DISK BRAKE FOR ELEVATOR

[75] Inventor: William Sheridan, Southington, Conn.

[73] Assignee: Otis Elevator Company, Farmington, Conn.

[21] Appl. No.: 904,248

[22] Filed: Jun. 25, 1992

Related U.S. Patent Documents

Reissue of:

[64] Patent No.: 5,101,939
Issued: Apr. 7, 1992
Appl. No.: 713,541
Filed: Jun. 7, 1991

U.S. Applications:

[63] Continuation of Ser. No. 508,627, Apr. 13, 1990, abandoned.

[51] Int. Cl.[6] ..... B60H 8/24

[52] U.S. Cl. ..... 188/171; 188/28; 188/59

[58] Field of Search ..... 188/28, 58, 59, 188/56, 72.6, 71.1, 85, 156, 163, 171, 173; 187/108, 32, 33, 73, 34, 35

[56] References Cited

U.S. PATENT DOCUMENTS

| | | | |
|---|---|---|---|
| 4,023,655 | 5/1977 | Anzai et al. | 188/171 |
| 4,060,153 | 11/1977 | Kobelt | 188/72.6 |
| 5,109,958 | 5/1992 | Kato et al. | 187/73 X |

*Primary Examiner*—Lee W. Young

[57] ABSTRACT

A caliper brake set engages a disk on the machine shaft or drive sheave to hold the elevator car in place at a landing. The brake set is biased by one or a pair of springs to a "brake-on" condition, and a solenoid assembly is provided to hold the brake set in a "brake off" condition when power is supplied to the solenoid. Camming levers are used in conjunction with the solenoid to provide a mechanical advantage which allows use of smaller solenoids. The brake shoes are spring biased for improved operation on the disk.

8 Claims, 5 Drawing Sheets

DISK BRAKE FOR ELEVATOR

Matter enclosed in heavy brackets [ ] appears in the original patent but forms no part of this reissue specification; matter printed in italics indicates the additions made by reissue.

*This application is a reissue of 07/713,541, Jun. 7, 1991, U.S. Pat. No. 5,101,939, which is a continuation of Ser. No. 07/508,627, filed Apr. 13, 1990, now abandoned.*

TECHNICAL FIELD

This invention relates to an improved brake assembly for use in holding an elevator car at a landing, which is also operable to stop the car under emergency conditions, as in a power failure or overspeed. More particularly, this invention relates to a caliper brake assembly for engagement with a disk secured to the elevator machine shaft or drive sheave to hold the latter against rotation.

BACKGROUND ART

Disk brakes which act upon a disk secured to an elevator machine shaft to hold the elevator car in place at landings are known in the prior art. The disk brakes in the prior art adapted for elevator use are full plate disk brakes wherein the brake shoes are operable to engage the periphery of the disk to hold the car in place. Full plate disk brakes may be prone to dirt and moisture problems, and are not amenable to solenoid stroke variations due to their mode of operation. They are also noisy due to the difficulty in controlling motion in the relatively short stroke of the flat faced armature.

DISCLOSURE OF THE INVENTION

This invention relates to a disk brake assembly for use in an elevator system wherein the disk brakes are caliper-type-brakes which are operative to engage a brake disk mounted on the machine shaft or drive sheave to hold the car in place at landings. More particularly, the disk brake assembly of this invention obtains a mechanical advantage whereby smaller solenoids can be used to hold the brake in an "off" condition. The larger stroke also provides the advantage of being able to control the noise of the plunger or core by stepping the solenoid plungers to bias the magnetic flux thus controlling the velocity and force of the plunger. The brake assembly of this invention is spring-biased "on", so that when power to the solenoid is interrupted, the brake will engage the brake [drum] *disk* by reason of spring action. The spring action can be supplied to the brake shoes by a single spring, or each brake shoe can be biased by its own individual spring. In the latter case, if one spring fails the other will cause engagement of one brake shoe with the disk which will be enough to hold the elevator at a landing safely. The brake assembly is modular whereby a number of assemblies can be ganged on a single disk for heavier duty elevators. The construction of the brake is such that some of its components and its solenoid can be repaired or cleaned after being detached from the assembly while the brake shoes engage the brake disk. The brake shoes are each spring biased on their mounts so that they will not tilt and drag on the brake disk when the brake is lifted.

It is therefore an object of this invention to provide an improved disk brake assembly for use in an elevator system for holding the car in place at landings and for emergency stopping of the car.

It is a further object of this invention to provide a brake assembly of the character described which is modular in construction.

It is another object of this invention to provide a brake assembly of the character described which includes a solenoid mechanism for lifting and holding the brake.

It is an additional object of the invention to provide a brake assembly of the character described which can be repaired and cleaned with the brake set holding the car in place.

It is yet another object of the invention to provide a brake assembly of the character described which includes individually spring-biased brake shoes to obviate dragging of the shoes on the disk when the brake is lifted.

These and other objects and advantages of the invention will become more readily apparent from the following detailed description of a preferred embodiment thereof when taken in conjunction with the accompanying drawings, in which:

BEST MODE FOR CARRYING OUT THE INVENTION

Figure 1:
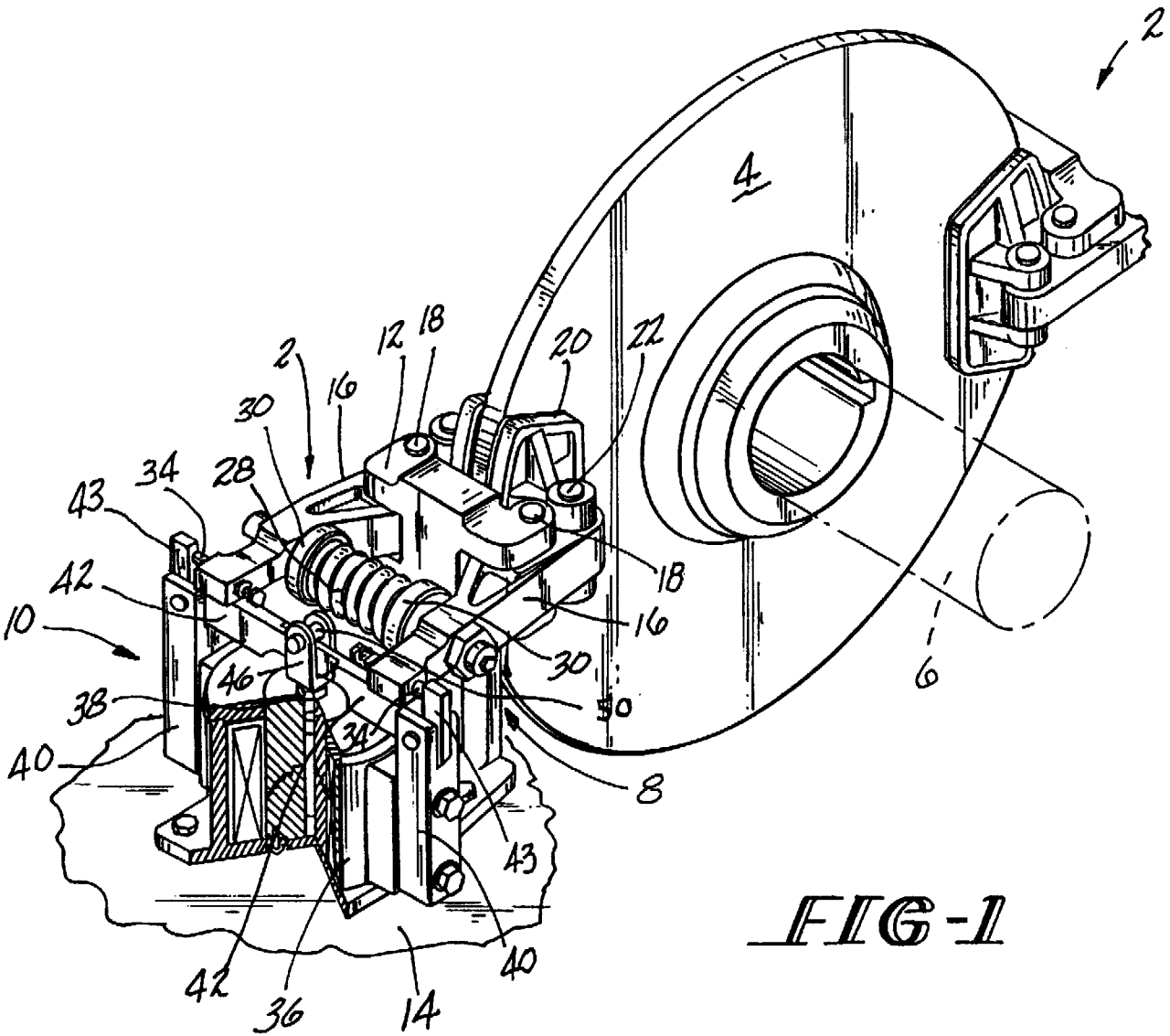
FIG. 1 is a perspective view of two of the brake modules and an associated disk which is keyed to the elevator machine shaft.

Referring now to FIG. 1, two identical brake modules 2 are shown operably interacting with a brake disk 4 which is keyed to and rotates with the shaft 6 (shown in phantom) of the elevator machine. Each module 2 includes a brake assembly 8 and a brake latch assembly 10.

Figure 2:
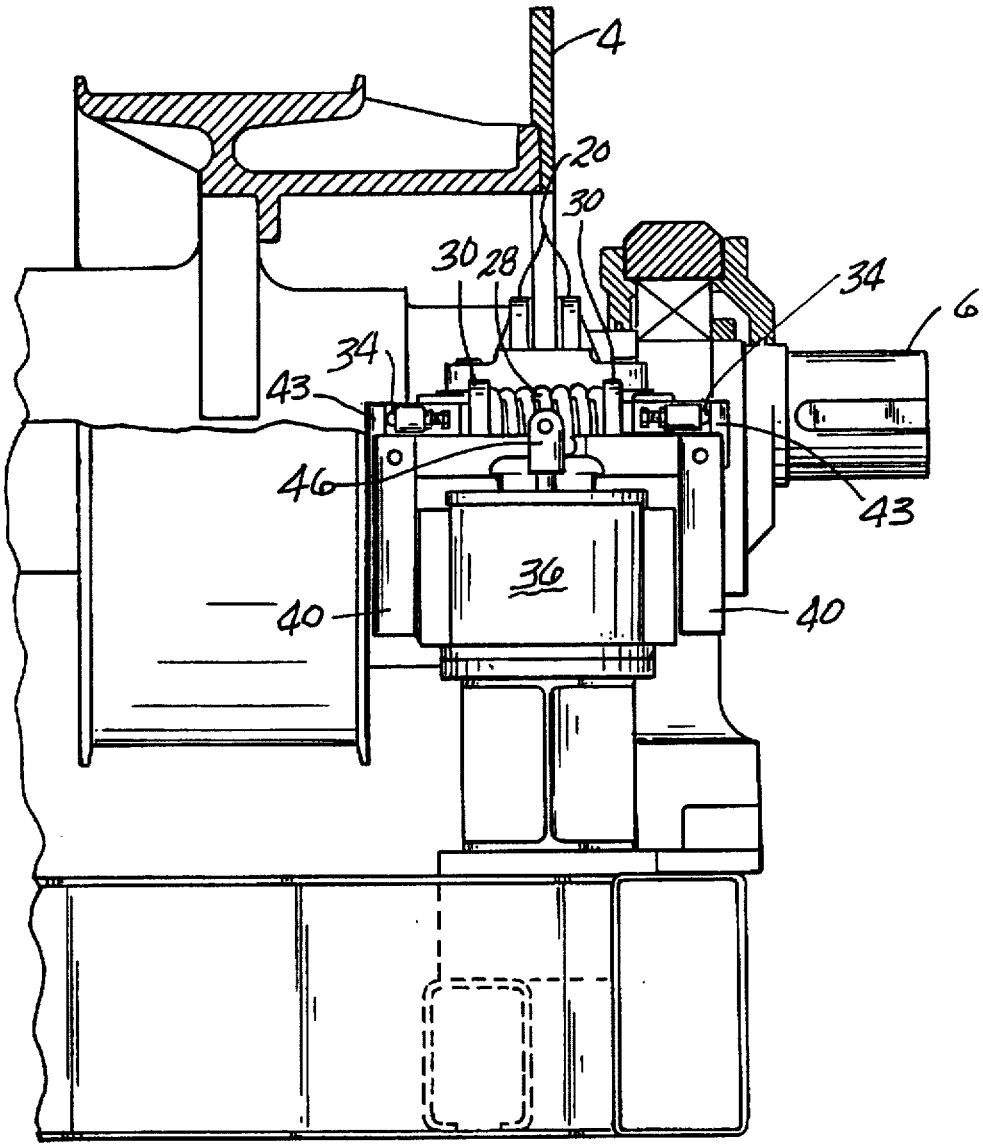
FIG. 2 is an elevational view partially in section showing the disk mounted on the sheave.

FIGS. 1 and 2 show details of the brake assembly 8. The brake assembly 8 includes a bracket 12 which is fixed to the machine frame or stand 14 (shown in phantom lines in FIGS. 1 and 2) and to which two opposed brake arms 16 are mounted for pivotal movement about vertical pins 22. The pins 18 pass through lugs 17 on the brake shoes 20, which lugs 17 are disposed above and below the brake arms 16. A brake shoe 20 is pivotally mounted on pins 22 to the brake arms 16 so as to flank the disk 4. A coil spring 24 sandwiched between each brake shoe 20 and its respective brake arm 16 biases each brake shoe 20 about its respective pin 22 and against the inner end of an adjustable screw 23 threaded into each arm 16, such that the brake pads 26 on the shoes 20 remain parallel to each other and to the disk 4. In this manner the pads 26 are prevented from dragging on the disk 4 when the brake is lifted. A brake actuating spring 28 is mounted in spring caps 30 carried on spring guides 32 which are secured to the brake arms 16. The spring 28 biases the arms 16 outwardly about the pins 18 thereby biasing the brake shoes 20 against the disk 4. This action will occur whenever power is removed from the solenoid 36. In the event of a power failure or an emergency, the brake will automatically [sit] *set* on the disk. The spring 28 thus supplies the force needed to set the brake. Cam pins 34 are mounted on the ends of the arms 16 distal of the brake shoes 20.

Figure 3:
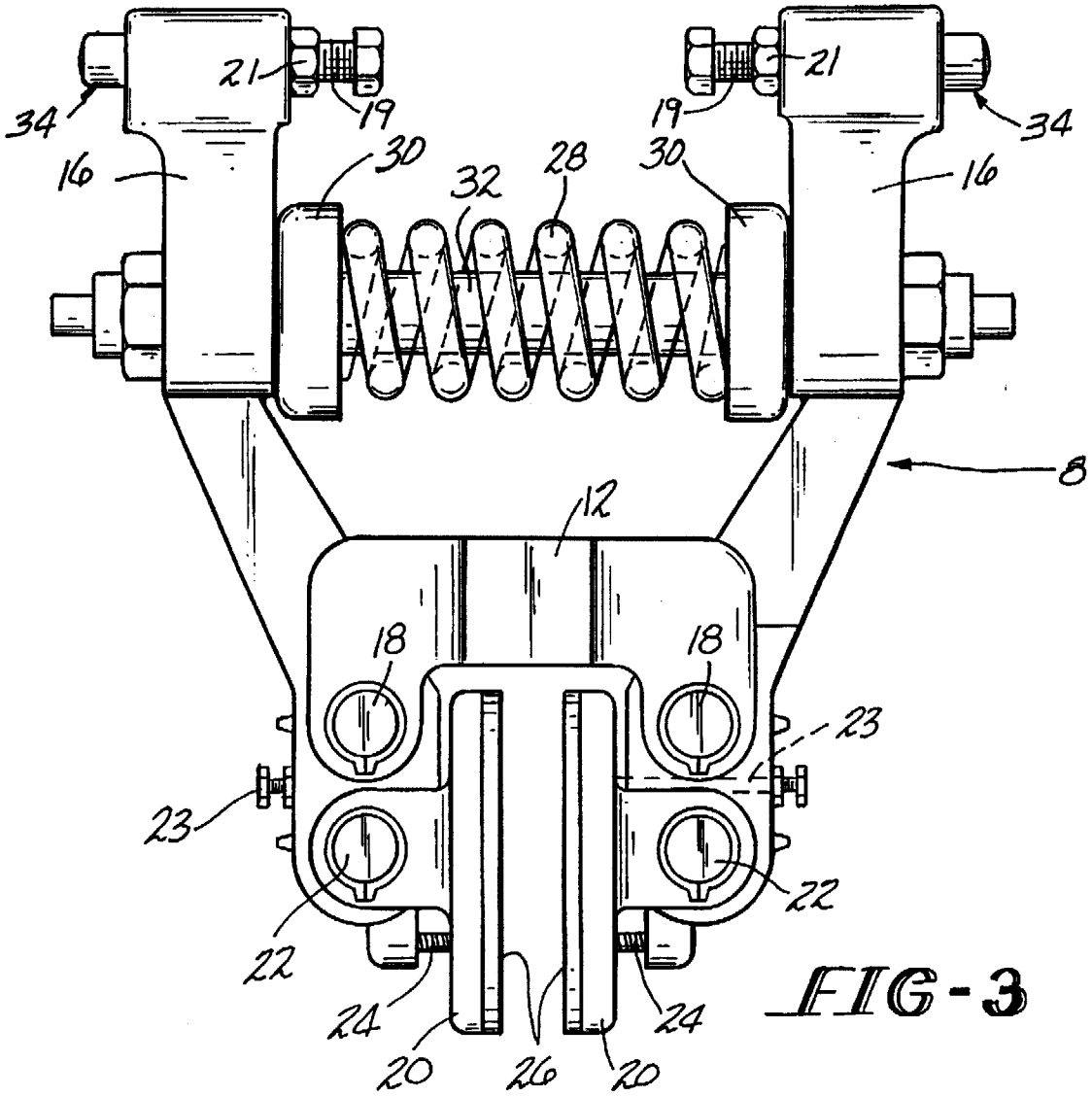
FIG. 3 is a top plan view of one of the brake modules.

FIGS. 1 and 3 show details of the brake latching assembly 10. The latch 10 includes a solenoid 36 containing an energizable coil, which solenoid 36 is fixed to the machine stand 14 and a solenoid actuated plunger 38 which moves up and down in the solenoid 36. Brackets 40 are mounted on opposite sides of the solenoid 36 and latch levers 42 with upturned fingers 43 are pivotally mounted on the brackets 40 via pins 44. A clevis 46 is disposed on the plunger 38 and receives overlapping ends 48 of the levers 42. A pin 50 spans the clevis 46 and overlies the ends 48 of the levers 42 thereby interconnecting the solenoid plunger 38 and the levers 42. The upturned fingers 43 on the levers 42 engage the cam pins 34 on the brake assembly 8.

It will be appreciated that when the latch levers 42 are disconnected from the mount brackets 40, and released from the clevis 46 by removing pin 50, the core pin 38 can simply be pulled up out of the solenoid core for cleaning or replacement.

Figure 4:
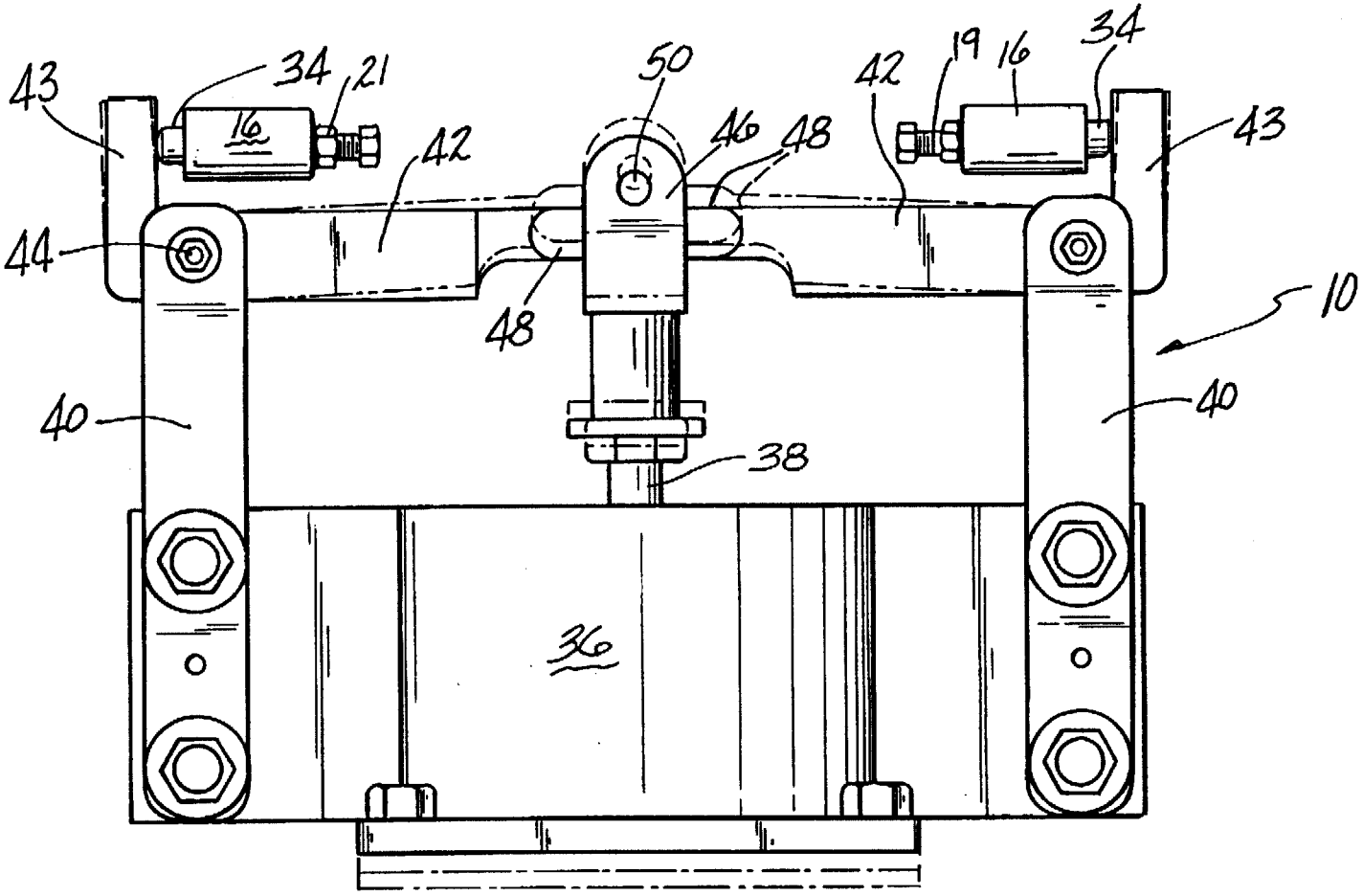
FIG. 4 is a front elevational view of the solenoid operated brake latch portion of the assembly.

When the solenoid 36 is supplied with electricity, the plunger 38 will be recessed in the solenoid 36, and the clevis 46, levers 42 and cam pins 34 will be in the positions shown in solid lines in FIG. 4. The cam pins 34 will thus be latched causing compression of the brake actuating spring 28 and lifting the brake shoes 20 off of the brake disk 4. When the elevator car is properly leveled at a landing, the elevator controller switches off electrical power to the solenoid 36 allowing the plunger 38 and clevis 46 to rise to the position shown in phantom lines in FIG. 4. This movement causes the levers 42 to pivot about the pins 44 to the respective positions shown in phantom in FIG. 4 whereby the actuating spring 28 is able to pivot the brake arms 16 about the pins 18 causing the brake shoe pads 26 to engage the disk 4. The enabling of the actuating spring 28 is the result of movement of the lever fingers 43 away from the cam pins 34, as shown in phantom lines in FIG. 4. The brake will thus be set on the disk 4, and the car held at the landing. When it is desired to move the car away from the landing, the controller switches power back on to the solenoid 36. This causes the plunger 38 to be drawn back into the solenoid 36 to return the clevis 46, levers 42 and cam pins 34 back to the respective positions shown in solid lines in FIG. 4. Movement of the cam pins 34 causes the brake pads 26 to lift off of the disk 4, and compresses the actuating spring 28.

Figures 5, 6:
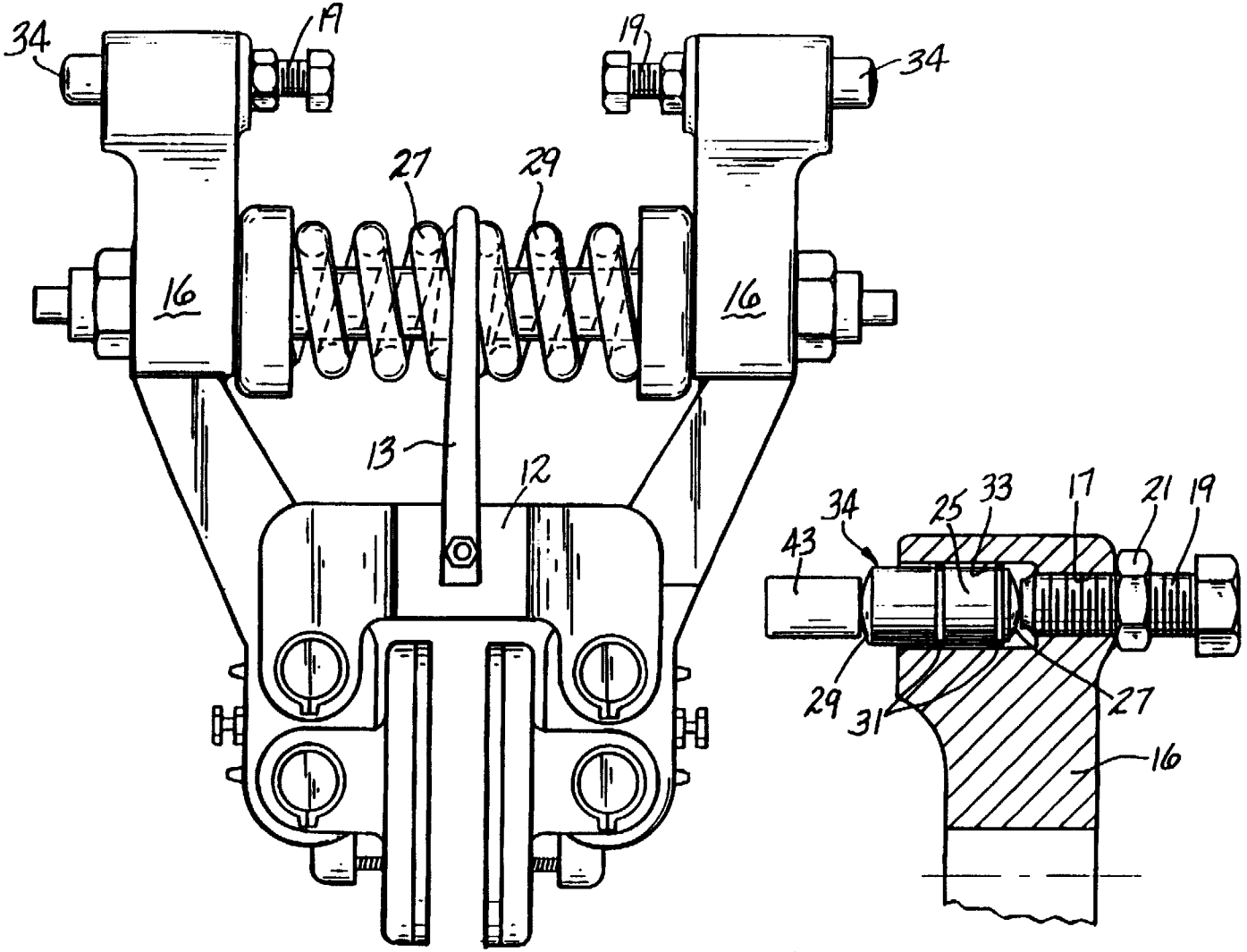
FIG. 5 is a view similar to FIG. 3 but showing the use of separate actuating springs for each brake arm.
FIG. 6 is a fragmented sectional view of the lever-engaging pin on the brake arms.

Referring to FIG. 6, details of the lever contact pin assembly 34 are shown. At the outer end of the brake arm 16, a threaded bore 17 is formed to receive an adjustment bolt 19 carrying a lock nut 21. The bore 17 opens into a smooth bore 33 in which a pin 25 is slideably disposed. The pin 25 has rounded end walls [27] *37* and [29] *39* and may carry a pair of friction rings 31 to snugly hold the pin 25 in place within the bore 33.

In FIG. 5 there is shown an alternate embodiment of the invention wherein two actuating springs 27 and 29 are used, one for independently biasing each of the levers 16. Each of the springs 27 and 29 seats on a central plate 13 which is fastened to the bracket 12. By using two separate springs, if one fails, the other one will still be operable to move one of the brake shoes against the disk 4 to provide some braking of the car at the landing.

It will be appreciated that the brake assembly of this invention provides several advantages over the prior art caliper disk brakes. Biasing the brake shoes on the brake arms ensures that the brake shoes will not drag on the disk when the brakes are applied or lifted, thereby quieting the brake. The use of levers in the latch assembly provides the mechanical advantage sufficient to allow the use of a small latch solenoid having a longer stroke. The longer stroke solenoid allows the use of the stepped core whereby noise may be reduced. The use of two actuating springs on the brake assembly assures that spring failure will not completely prevent the brake from operating. The modular construction of the assembly enables one unit to be used in lighter duty elevators, and multiple units to be used in heavier duty elevators. It also allows repair and cleaning of the latch assembly components while the brake is set.

Since many changes and variations of the disclosed embodiments of the invention may be made without departing from the inventive concept, it is not intended to limit the invention otherwise than as required by the appended claims.

What is claimed is:

1. An elevator caliper disk brake assembly comprising:

(a) a pair of brake shoes pivotally mounted on vertical pins on an associated pair of horizontal brake arms, said brake shoes having opposed planar vertical braking surfaces and said brake shoes having a pair of horizontal lugs straddling said brake arms above and below the latter;

(b) horizontal spring means disposed between said brake arms for engaging said brake arms to bias said brake shoes toward each other;

(c) a brake disk interposed between said brake shoes, said brake disk having parallel opposite vertical side surfaces facing respective ones of said braking surfaces;

(d) stop means on each of said brake arms for engagement with a respective one of said brake shoes to limit pivotal movement of said brake shoes on said brake arms in one direction;

(e) springs on each of said brake arms for biasing each of said brake shoes against its respective stop means, said stop means and said springs being operable to retain said braking surfaces substantially parallel to said side surfaces of said brake disk; and (f) latching means including:

(i) a pair of horizontal pivotally mounted levers for engagement with said brake arms to hold the latter against the bias of said spring means; and (ii) solenoid latch actuating means including a cylindrical solenoid plunger operably engaging said levers to selectively hold the latter against said brake arms, said plunger being reciprocally vertically movable between latch-on and latch-off positions to selectively latch and release said brake arms said solenoid plunger having a constant diameter and being telescoped into a conforming cylindrical passage in the solenoid whereby said solenoid plunger is freely slidable in said passage and can be freely lifted out of said passage after disengagement from said levers.

2. The brake assembly of claim 1 wherein said spring means comprises a pair of coil springs each engaging one of said brake arms to independently bias said brake shoes toward each other.

3. The brake assembly of claim 1 wherein said solenoid plunger is connected to adjacent ends of said levers with a common connecting pin.

4. The brake assembly of claim 3 wherein said adjacent ends of said levers are overlapped.

5. The brake assembly of claim 1 further comprising contact means for providing operating contact between said brake arms and said levers, said contact means comprising contact pins slideably mounted on ends of said brake arms distal of said brake shoes, and arranged for engagement with said levers, and means for adjustably moving said contact pins toward and away from said levers to modify the positioning of said levers.

6. The brake assembly of claim 5 wherein said contact pins are provided with rounded ends engaging said levers for providing point contact between said brake arms and levers.

7. The brake assembly of claim 1 wherein said stop means is adjustable whereby the pivotal position of said brake shoes on said brake arms can be varied.

*8. A brake unit for an elevator hoist apparatus for use with an electric motor output shaft, comprising:*

*a brake disc having two braking surfaces and connected to the motor output shaft for rotation therewith;*

*a pair of brake arm assemblies each having a movable brake arm having a first end and second end and a brake shoe mounted on the first end of the brake arm, each of the brake arm assemblies being movably disposed in the vicinity of the brake disc for selective braking engagement of the brake shoes with the braking surfaces of the brake disc;*

*brake spring means for biasing the brake shoes on the brake arms toward the braking surfaces;*

*a pair of levers, each of which is pivotally supported on an axis perpendicular to the axis of the output shaft, each of the levers having a first end and second end engageable with the second end of one of the brake arms; and*

*actuator means for engaging with the first ends of the levers and pivoting the levers about their respective axis, thereby separating the brake shoes from the brake disc against the force of the brake spring means.*

* * * * *